(12) United States Patent
Tsai et al.

(10) Patent No.: US 7,857,112 B1
(45) Date of Patent: Dec. 28, 2010

(54) HYDRAULIC BRAKE

(75) Inventors: Peng-Hsi Tsai, Taichung (TW);
Tan-Kuei Lou, Taichung (TW)

(73) Assignee: Elite Sewing Maching Mfg. Co., Ltd., Taichung (TW)

( * ) Notice: Subject to any disclaimer, the term of this patent is extended or adjusted under 35 U.S.C. 154(b) by 0 days.

(21) Appl. No.: 12/800,747

(22) Filed: May 21, 2010

(30) Foreign Application Priority Data

Dec. 30, 2009 (TW) .............................. 98145917 A (51) Int. Cl.
*B60T 11/16* (2006.01)
(52) U.S. Cl. ...................................... 188/344
(58) Field of Classification Search ............. 188/24.11, 188/24.22, 26, 344; 74/502.2; 60/588
See application file for complete search history.

(56) References Cited

U.S. PATENT DOCUMENTS

| | | | | |
|---|---|---|---|---|
| 5,813,501 A | * | 9/1998 | Terry, Sr. .................... | 188/344 |
| 6,003,639 A | * | 12/1999 | Buckley et al. ................ | 188/26 |
| 6,804,961 B2 | * | 10/2004 | Lumpkin ...................... | 60/588 |
| 7,222,703 B2 | * | 5/2007 | Laghi et al. .................. | 188/344 |
| 7,530,435 B2 | * | 5/2009 | Lumpkin ..................... | 188/344 |
| 2008/0245632 A1 | * | 10/2008 | Watarai et al. .............. | 188/344 |
| 2009/0152061 A1 | * | 6/2009 | Tsai ........................... | 188/344 |
| 2010/0051400 A1 | * | 3/2010 | Yang ........................... | 188/344 |

* cited by examiner

*Primary Examiner*—Christopher P Schwartz
(74) *Attorney, Agent, or Firm*—Holland & Hart, LLP (57) ABSTRACT

A hydraulic brake includes a body defining a cylinder, a piston disposed within the cylinder, a brake lever disposed pivotally on the body, a first pivot disposed rotatably on the brake lever, and a push rod unit connected between the piston and the brake lever and including a sleeve member and a first adjustment rod. The sleeve member has a first end confined in the cylinder, a second end connected pivotally to the first pivot, and an adjustment hole extending from the first end to the second end and in spatial communication with a through hole in the first pivot. The first adjustment rod engages threadably the adjustment hole, and has an inner end in contact with the piston, and an outer end disposed outwardly of the through hole. The first adjustment rod is threadable within the sleeve member to vary a starting position of the piston.

10 Claims, 11 Drawing Sheets

HYDRAULIC BRAKE

CROSS-REFERENCE TO RELATED APPLICATION

This application claims priority of Taiwanese Application No. 098145917, filed on Dec. 30, 2009.

BACKGROUND OF THE INVENTION

1. Field of the Invention

This invention relates to a brake lever, and more particularly to a hydraulic brake that includes a brake lever.

2. Description of the Related Art

Figure 1:
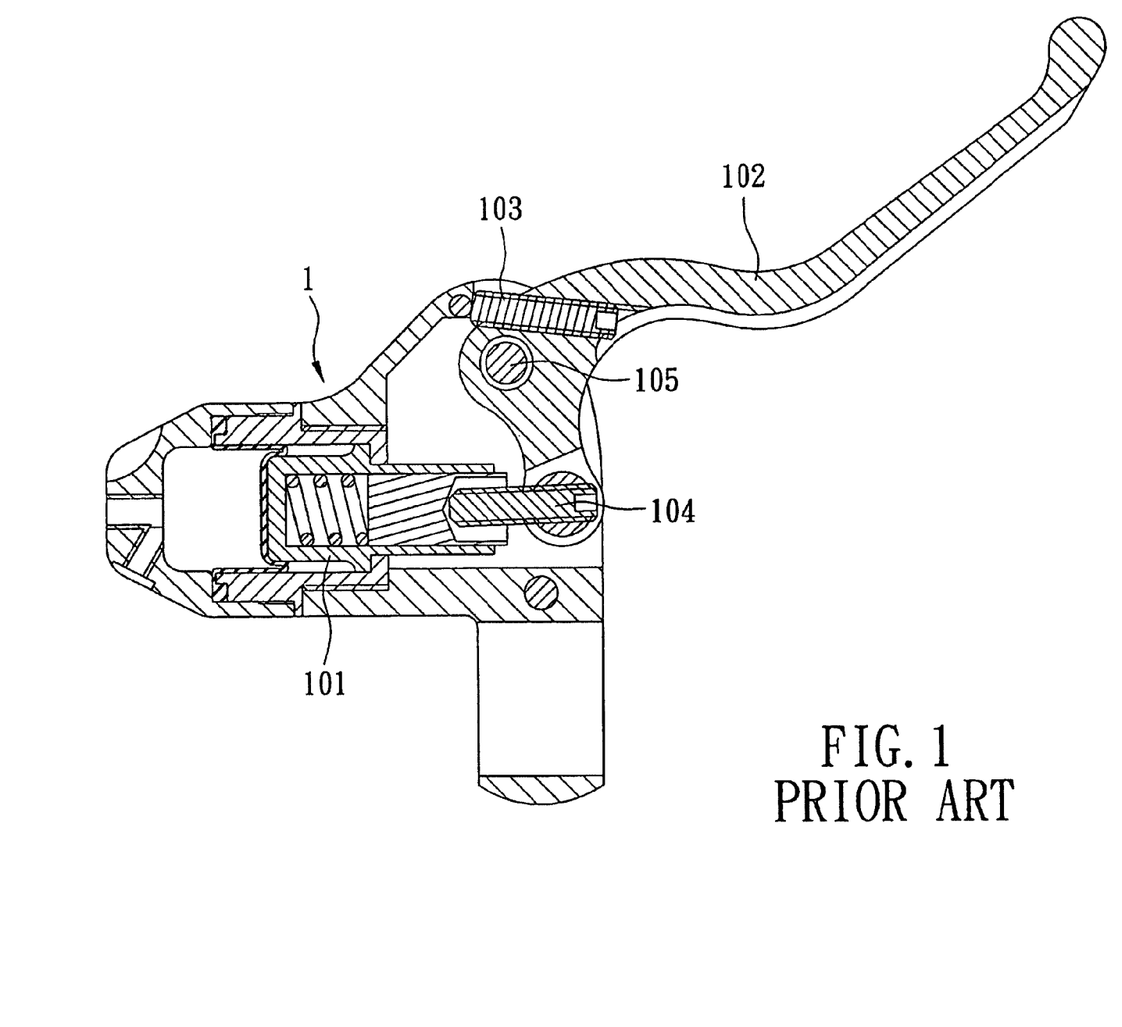
FIG. 1 is a schematic sectional view of a first conventional hydraulic brake disclosed in U.S. Pat. No. 5,813,501.

Referring to FIG. 1, a first conventional hydraulic brake disclosed in U.S. Pat. No. 5,813,501 includes a body 1, a piston 101 disposed within the body 1, and a brake lever 102 disposed pivotally on the body 1. By rotating a setscrew 103 on the brake lever 102, a reach (i.e., the distance between the brake lever 102 and a bicycle handlebar) can be adjusted. By rotating an adjustment screw 104 on the brake lever 102, a starting position of the piston 101 can be adjusted.

During adjustment of the reach or the starting position, operation of each of the setscrew 103 and the adjustment screw 104 results in rotation of the other one of setscrew 103 and the adjustment screw 104. Hence, readjustment of the setscrew 103 and the adjustment screw 104 is required. Further, since the ratio of the distance between the setscrew 103 and the brake lever 102 to that between the adjustment screw 104 and the brake lever 102 is 1:3, a relatively large change of the starting position occurs when the reach is adjusted.

Figure 2:
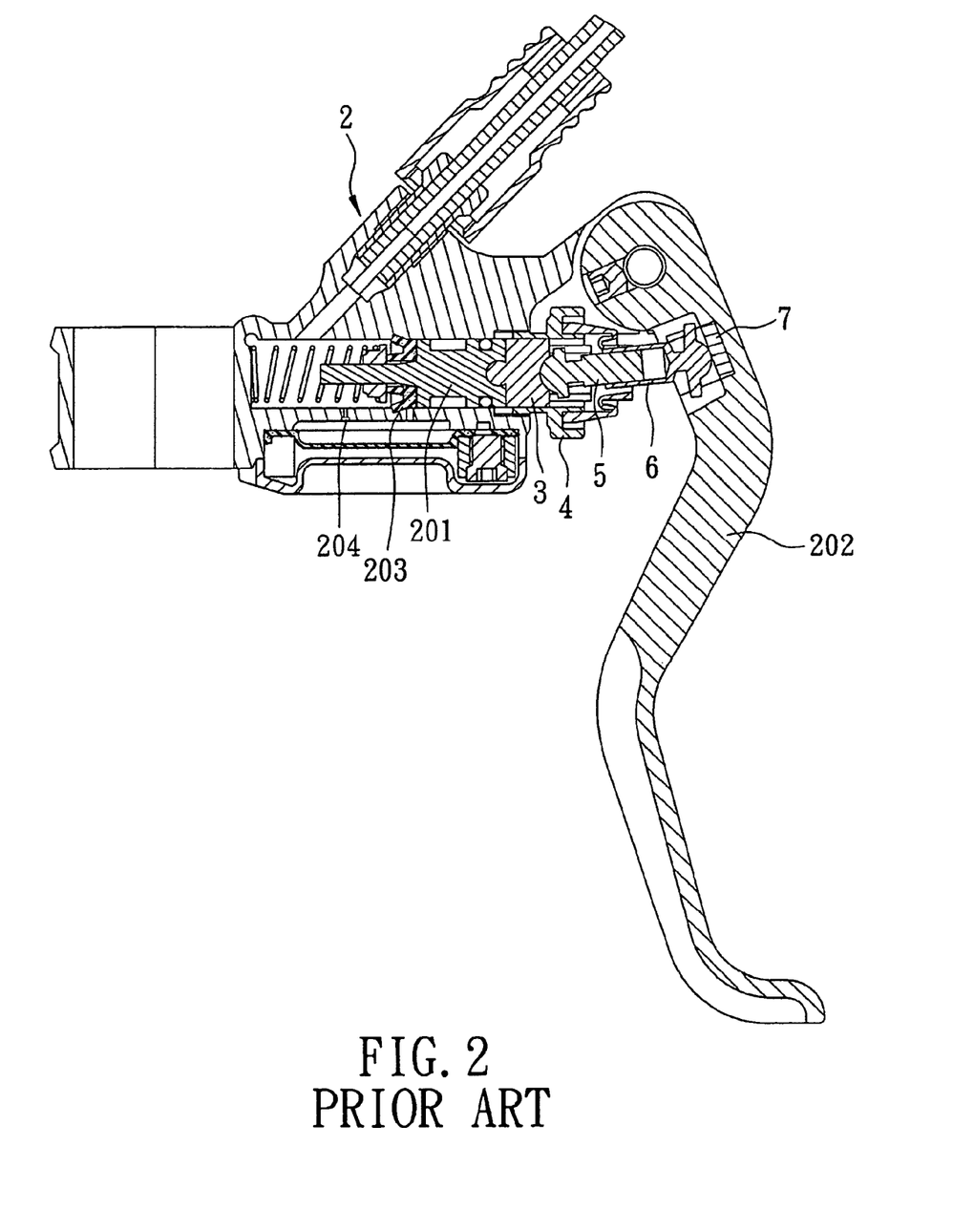
FIG. 2 is a schematic sectional view of a second conventional hydraulic brake disclosed in U.S. Pat. No. 6,804,961.
Figure 3:
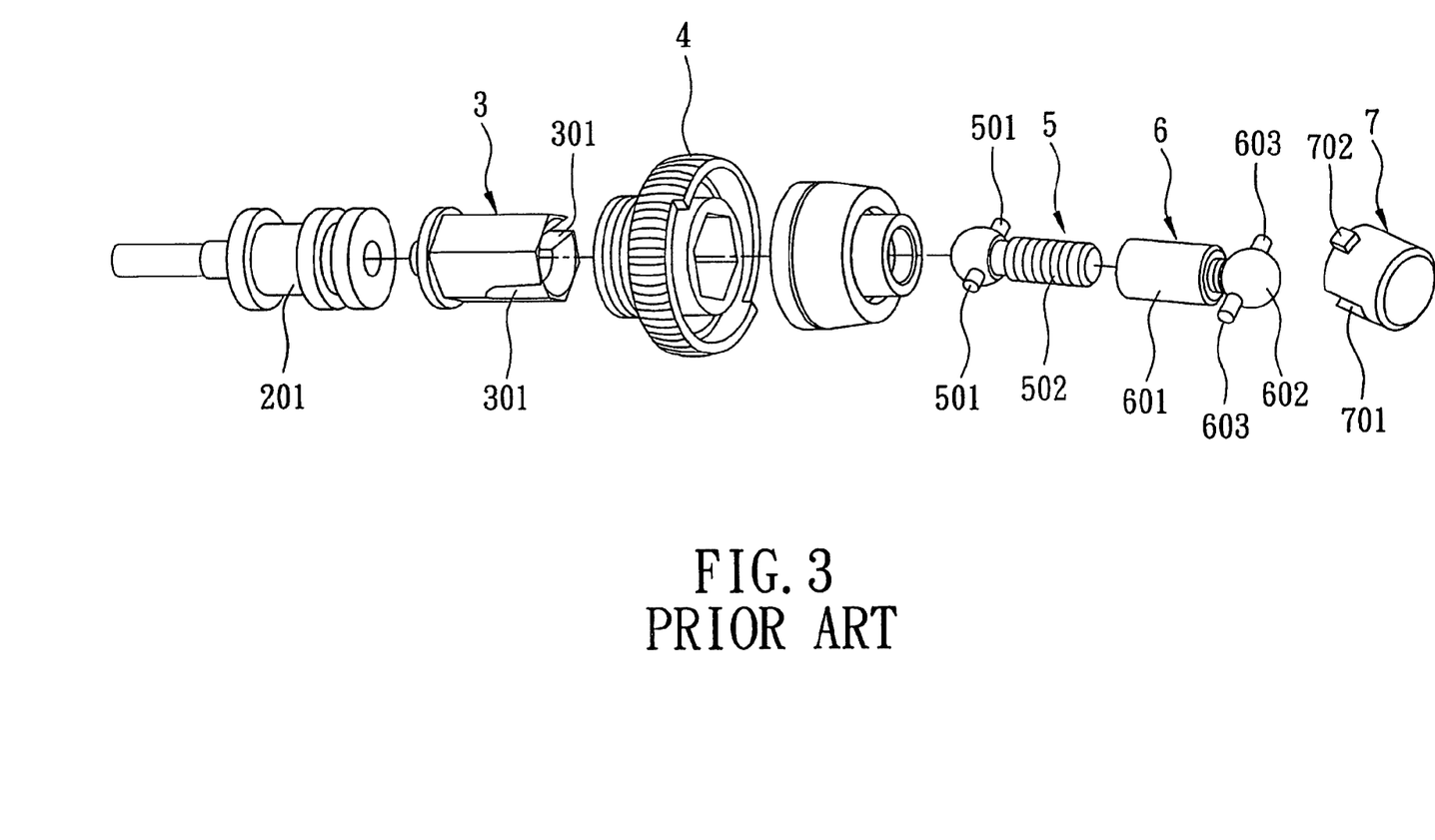
FIG. 3 is a fragmentary, exploded perspective view of the second conventional hydraulic brake.

Referring to FIGS. 2 and 3, a second conventional hydraulic brake disclosed in U.S. Pat. No. 6,804,961 includes a body 2, a piston 201 disposed within the body 2, a brake lever 202 disposed pivotally on the body 2, a hex spacer 3 fitted partially into the piston 201 and having two retaining slots 301, an adjustment knob 4 engaging threadably the body 2 and formed with a hex hole permitting the hex spacer 3 to be fitted thereinto, a male pushrod 5 extending through the adjustment knob 4, a female pushrod 6 engaging threadably the male pushrod 5, and a socket insert 7 disposed removably between the female pushrod 6 and the brake lever 202. The male pushrod 5 includes two posts 501 engaging respectively the retaining slots 301 in the hex spacer 3, and an externally threaded shaft 502. The female pushrod 6 includes an internally threaded cylinder 601 engaging the externally threaded shaft 502, a ball head 602, and two posts 603. The socket insert 7 includes two slots 701 engaging respectively the posts 603, and two post 702 connected removably to the brake lever 202. As such, by rotating the adjustment knob 4, a starting position of the piston 201 can be adjusted to thereby vary a dead band distance between a seal 203 and a port 204. When the adjustment knob 4 is operated to rotate together with the hex spacer 3, the threading movement of the male pushrod 5 relative to the female pushrod 6 occurs to change the total length of the male and female pushrods 5, 6 to thereby maintain the reach of the brake lever 202 unchanged. However, such a hydraulic brake is complicated in construction.

Furthermore, to adjust the reach, the brake lever 202 is first pushed away from the body 2 to remove the socket insert 7 from the ball head 602 of the female pushrod 6. Next, the male pushrod 5 is threaded relative to the female pushrod 6. Finally, the socket insert 7 is mounted back onto the ball head 602. Consequently, it is difficult to adjust the reach.

SUMMARY OF THE INVENTION

The object of this invention is to provide a hydraulic brake that is simple in structure, that is easy to adjust a starting position of a piston and a reach between a brake lever and a handlebar, and that cannot cause a significant change of the reach when adjusting the starting position.

According to this invention, a hydraulic brake includes a body defining a cylinder, a piston disposed within the cylinder, a brake lever disposed pivotally on the body, a first pivot disposed rotatably on the brake lever, and a push rod unit connected between the piston and the brake lever and including a sleeve member and a first adjustment rod. The sleeve member has a first end confined in the cylinder, a second end connected pivotally to the first pivot, and an adjustment hole extending from the first end to the second end and in spatial communication with a through hole. The first adjustment rod engages threadably the adjustment hole, and has an inner end in contact with the piston, and an outer end disposed outwardly of the through hole in the first pivot. The first adjustment rod is threadable within the sleeve member to vary a starting position of the piston.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 4:
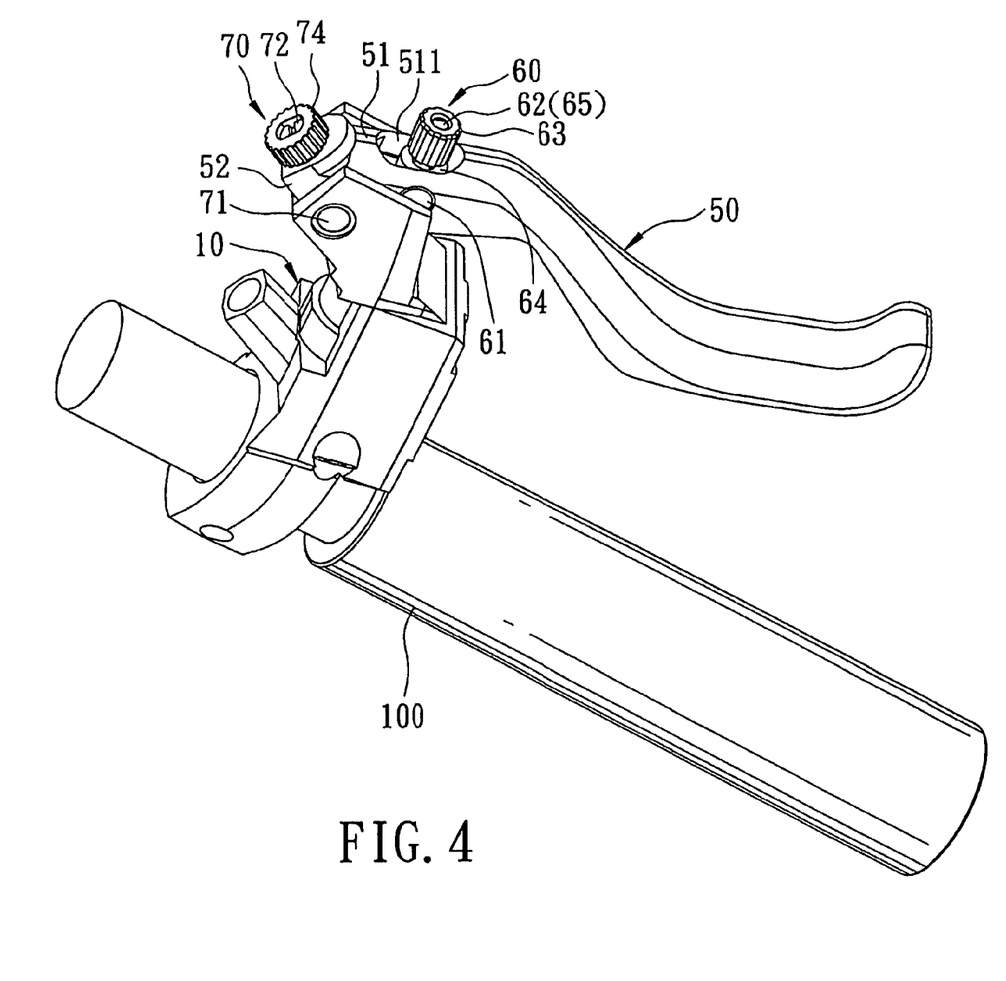
FIG. 4 is an assembled perspective view of the preferred embodiment of a hydraulic brake according to this invention.
Figure 5:
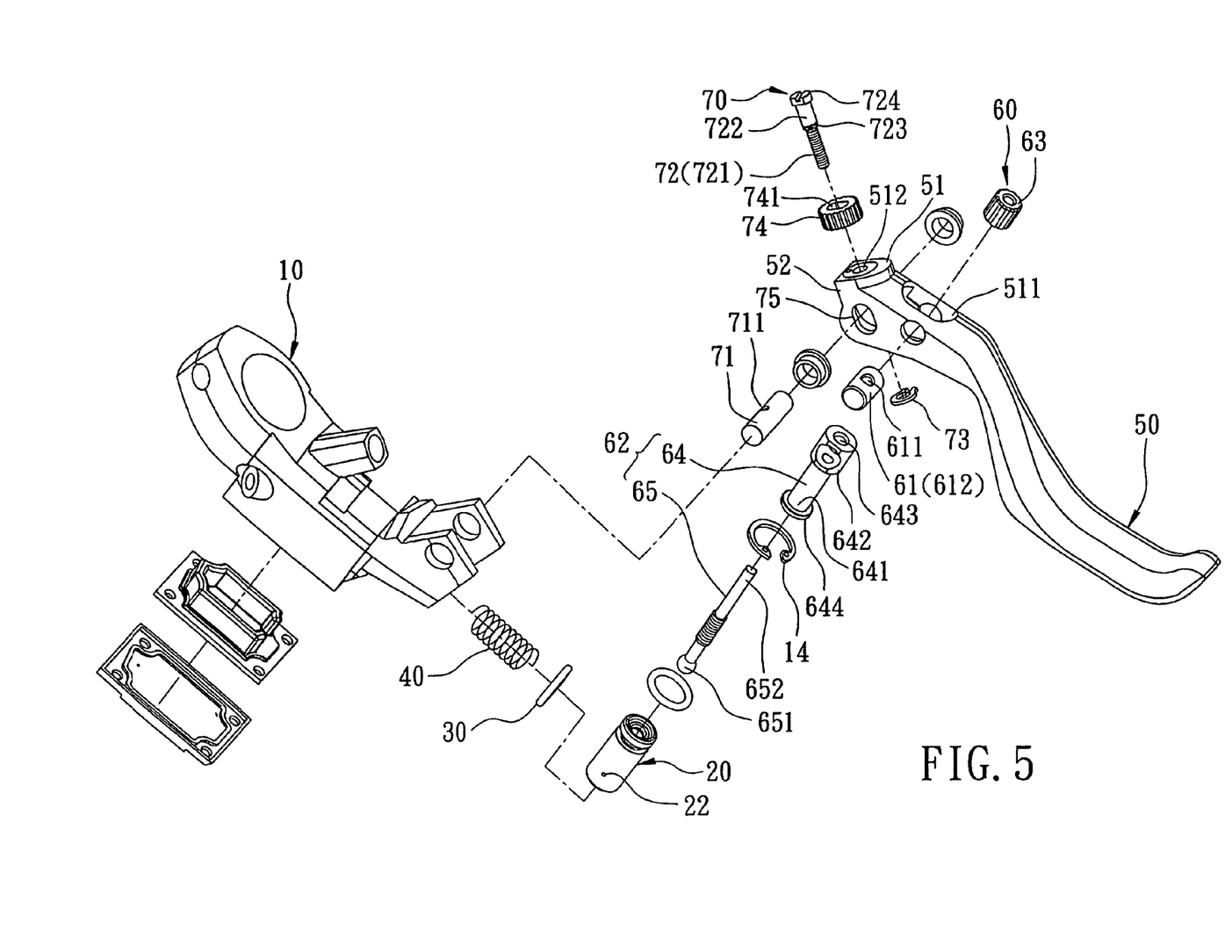
FIG. 5 is an exploded perspective view of the preferred embodiment.
Figure 6:
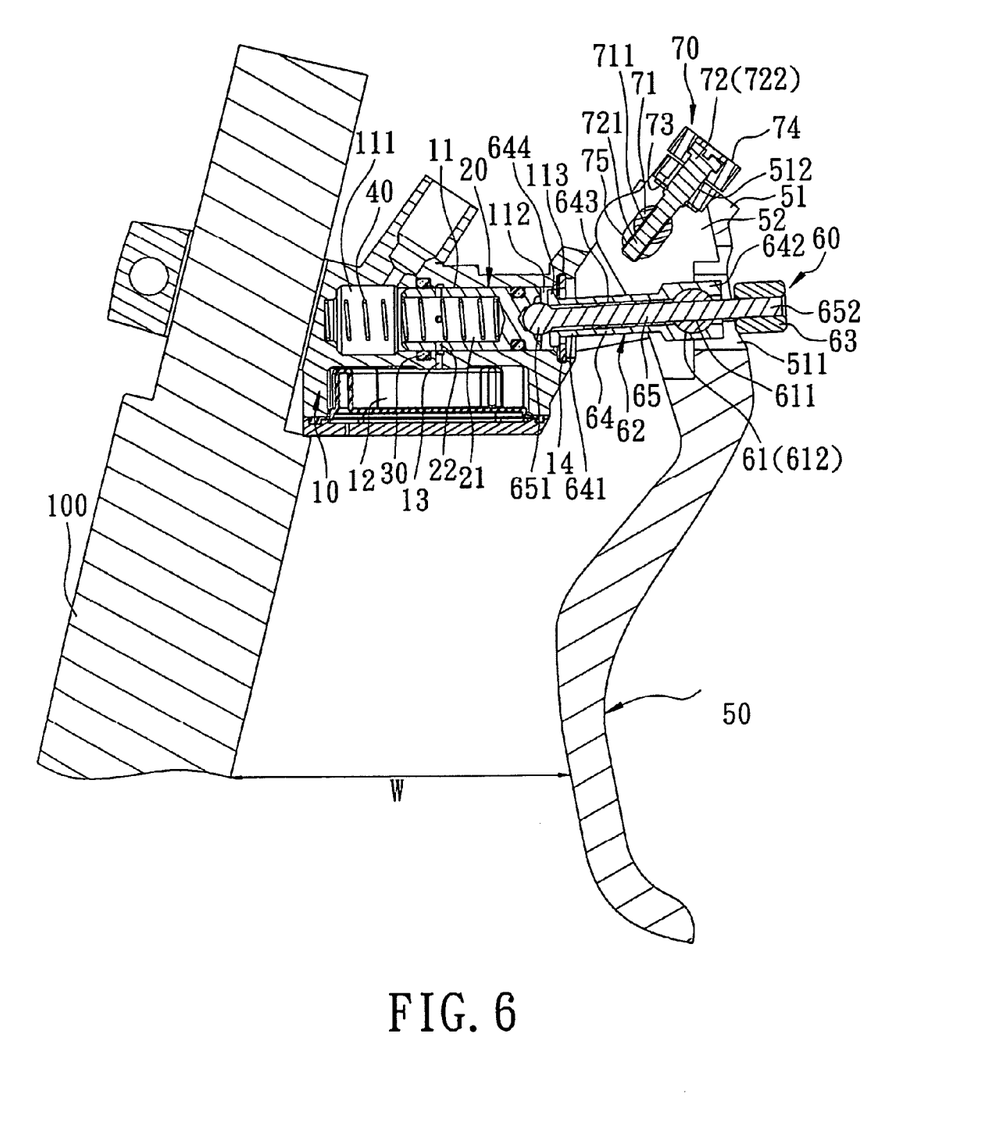
FIG. 6 is a schematic sectional view of the preferred embodiment, illustrating a piston at a starting position.

Referring to FIGS. 4, 5, and 6, the preferred embodiment of a hydraulic brake according to this invention includes a body 10, a piston 20, a seal 30, a spring 40, a brake lever 50, a piston-adjusting unit 60, and a reach-adjusting unit 70.

The body 10 defines a cylinder 11, a fluid reservoir 12, and a connecting port 13 disposed between and in fluid communication with the cylinder 11 and the fluid reservoir 12. The body 10 includes a C-shaped retaining ring 14. The cylinder 11 has opposite inner and outer ends 111, 112, and an inner surface formed with an annular groove 113. The connecting port 13 is disposed between the seal 30 and the outer end 112 of the cylinder 11. The C-shaped retaining ring 14 is received within the annular groove 113 in the cylinder 11. The body 10 is disposed on a bicycle handlebar 100.

Figure 7:
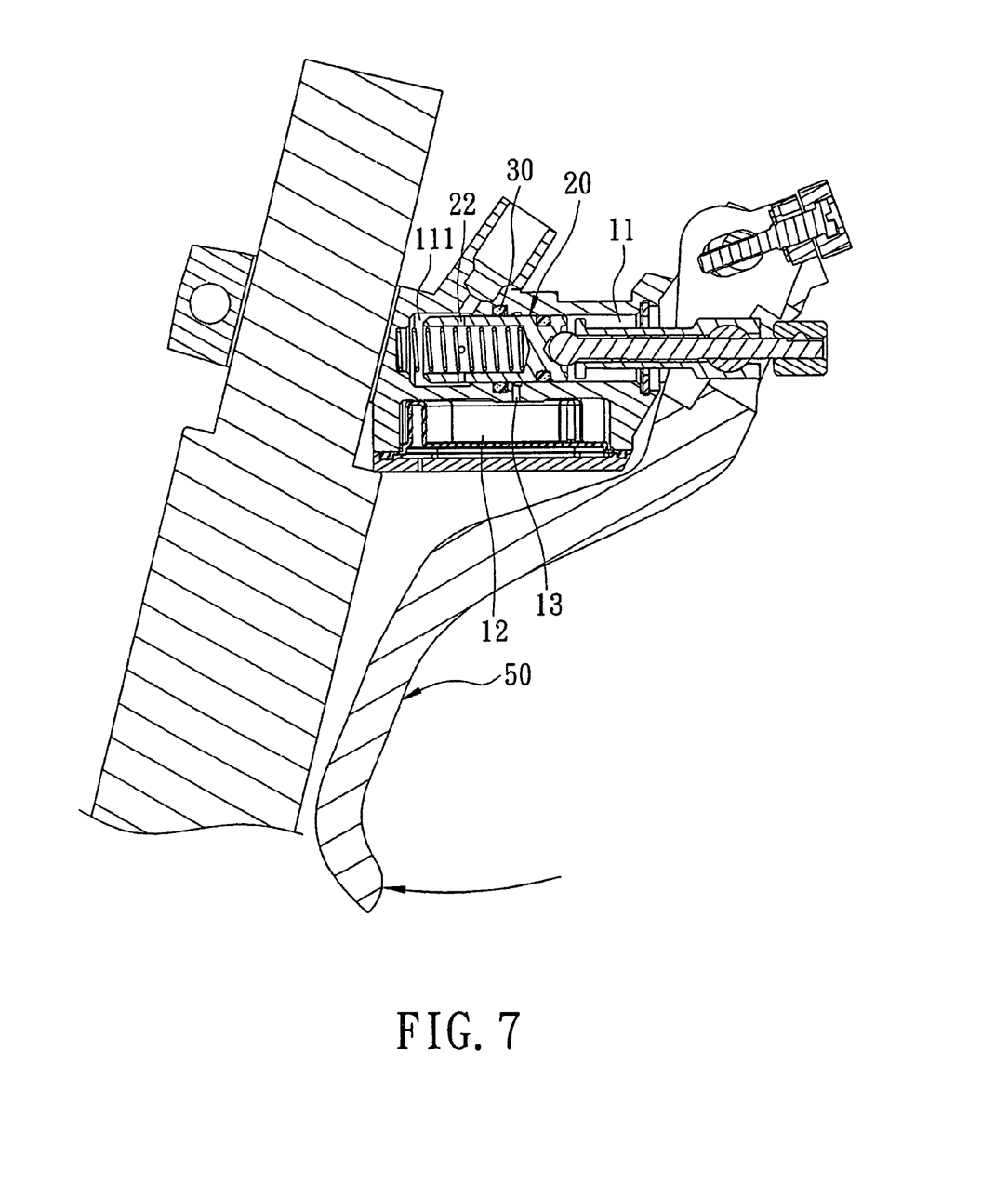
FIG. 7 is a view similar to FIG. 6 but illustrating the piston at a pressurized position.

The piston 20 is disposed within the cylinder 11 between the inner and outer ends 111, 112, and has an accommodating groove 21 opening toward the inner end 111, and a plurality of radial holes 22 extending radially and in fluid communication with the accommodating groove 21. The piston 20 is movable relative to the cylinder 11 between a starting position shown in FIG. 6 whereat the brake lever 50 is in an idle condition, and a pressurized position shown in FIG. 7 whereat a force is applied for rotating the brake lever 50 toward the handlebar 100. When the piston 20 is at the starting position, the radial holes 22 are disposed between the seal 30 and the outer end 112, and are in fluid communication with the connecting port 13, so that fluid flow between the cylinder 11 and the fluid reservoir 12 is allowed. When the piston 20 is at the pressurized position, the radial holes 22 are disposed between the inner end 111 and the seal 30 so as not to be in fluid communication with the connecting port 13, thereby interrupting fluid flow between the cylinder 11 and the fluid reservoir 12. As such, in the pressurized position, the piston 20 exerts a pushing force on the fluid within the cylinder 11 to drive flow of the fluid out of the cylinder 11 via a fluid conduit (not shown).

The seal 30 is disposed between the cylinder 11 and the piston 20 and between the inner and outer ends 111, 112 of the cylinder 11 so as to establish a fluid-tight seal between the cylinder 11 and the piston 20.

The spring 40 is disposed within the accommodating groove 21 between the inner end 112 of the body 11 and the piston 20 for biasing the piston 20 to move away from the inner end 111 of the cylinder 11.

The brake lever 50 is disposed pivotally on the body 10, and has an outer sidewall 51 and two spaced-apart lug walls 52 extending respectively from two opposite sides of the outer sidewall 51. The outer sidewall 51 has a penetrating hole 511 and a through hole 512 that are formed therethrough.

The piston-adjusting unit 60 includes a first pivot 61 disposed rotatably on the lug walls 52 of the brake lever 50, a push rod unit 62 connected between the piston 20 and the brake lever 50, and a rotary knob 63.

The first pivot 61 has a through hole 611 formed therethrough, and an outer peripheral surface 612.

The push rod unit 62 includes a sleeve member 64 and a first adjustment rod 65. The sleeve member 64 has a first end 641 confined in the cylinder 11, a second end 642 opposite to the first end 641 and connected pivotally to the outer peripheral surface 612 of the first pivot 61, an adjustment hole 643 extending from the first end 641 to the second end 642 and in fluid communication with the through hole 611 in the first pivot 61, and an outward flange 644 extending radially and outwardly from the first end 641. The C-shaped retaining ring 14 is sleeved on the sleeve member 64 and adjacent to the first end 641 for confining the first end 641 within the cylinder 11. The first adjustment rod 65 engages threadably the adjustment hole 643 in the sleeve member 64, and has an inner end 651 in contact with the piston 20, and an outer end 652 disposed outwardly of the through hole 611.

The rotary knob 63 is connected to and co-rotatable with the outer end 652 of the first adjustment rod 65. The first adjustment rod 65 is threadable within the sleeve member 64 to vary the starting position and, thus, the brake sensitivity.

In this embodiment, the first adjustment rod 65 extends through the penetrating hole 511 in the brake lever 50, such that the outer end 652 of the first adjustment rod 65 and the rotary knob 63 are disposed outwardly of the penetrating hole 511.

The reach-adjusting unit 70 includes a second pivot 71 disposed on the body 10, a second adjustment rod 72 disposed pivotally on the brake lever 50 and engaging threadably the second pivot 71, a C-shaped retaining ring 73 sleeved on the second adjustment rod 72, a rotary knob 74 disposed on and co-rotatable with the second adjustment rod 72, and two adjustment slots 75 formed respectively through the lug walls 52 and permitting the second pivot 71 to be moved therewithin in a longitudinal direction of the second adjustment rod 72. In this embodiment, the C-shaped retaining ring 73 is received within an annular groove 723 (see FIG. 5) in the second adjustment rod 72, and the second adjustment rod 72 has a non-circular head 724 engaging fittingly a non-circular hole 741 in the rotary knob 74 so as to prevent relative rotation between the second adjustment rod 72 and the rotary knob 74.

The second pivot 71 has a threaded hole 711. The second adjustment rod 72 has a threaded section 721 engaging the threaded hole 711, and a pivot end portion 722 extending from the threaded section 721 and formed with the annular groove 723. The pivot end portion 722 extends through the through hole 512 in the brake lever 50, and is connected pivotally to the outer sidewall 51. The C-shaped retaining ring 73 abuts against an inner surface of the outer sidewall 51 so as to allow for rotation of the second adjustment rod 72 relative to the brake lever 50, while preventing movement of the second adjustment rod 72 relative to the brake lever 50. The rotary knob 74 is retained on an outer surface of the outer sidewall 51 by the C-shaped retaining ring 73.

When the second adjustment rod 72 is threaded relative to the second pivot 71, an assembly of the pivot end portion 722, the rotary knob 74, and the C-shaped retaining ring 73 pushes and rotates the brake lever 50 about the first pivot 61, thereby varying a reach or reach distance (W) between finger-engaging portions of the brake lever 50 and the handlebar 100.

Figure 8:
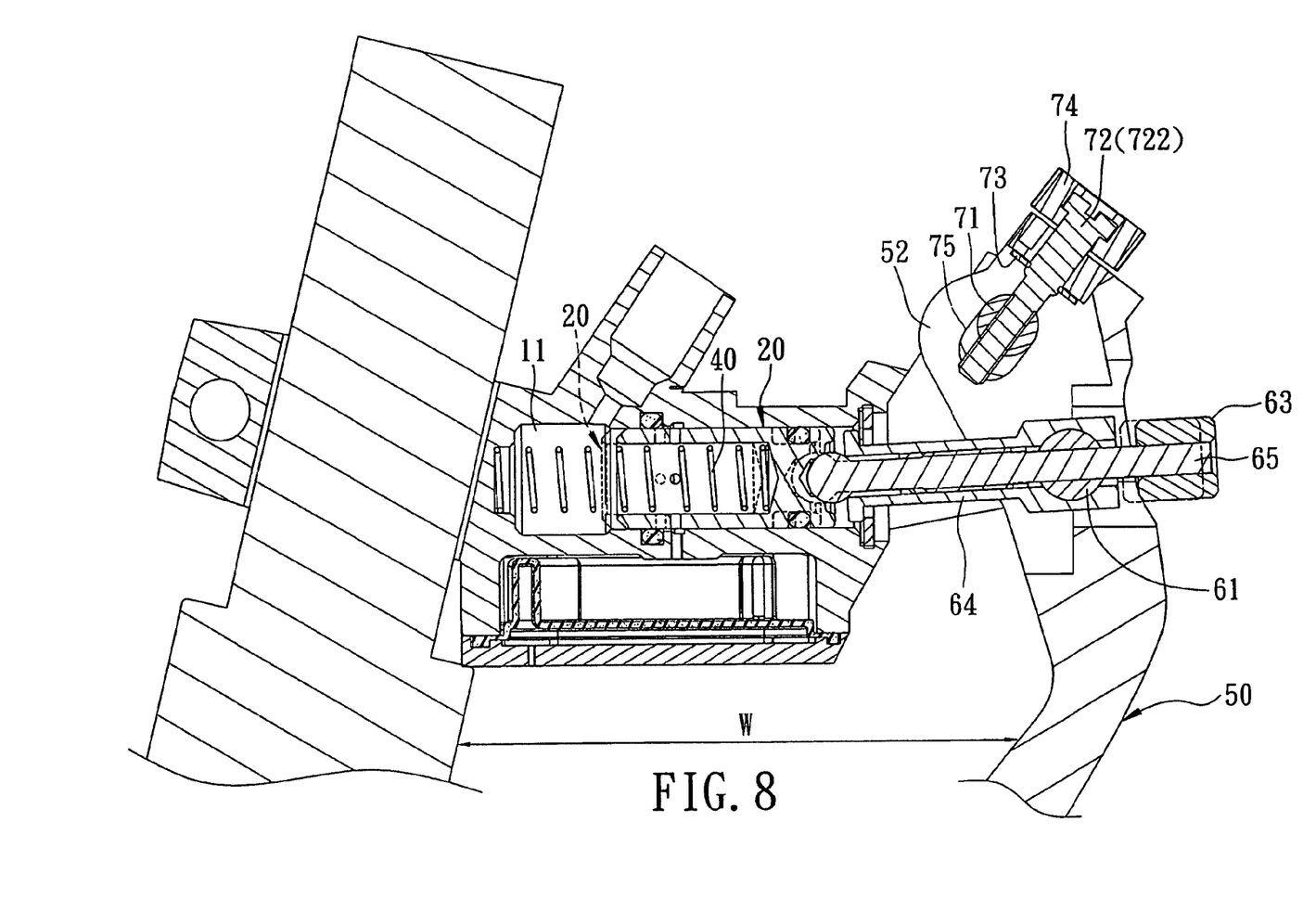
FIG. 8 is a fragmentary, schematic sectional view of the preferred embodiment, illustrating a brake lever at a largest-reach position and illustrating how a reach distance between the brake lever and a handlebar is maintained unchanged when the starting position is adjusted.
Figure 9:
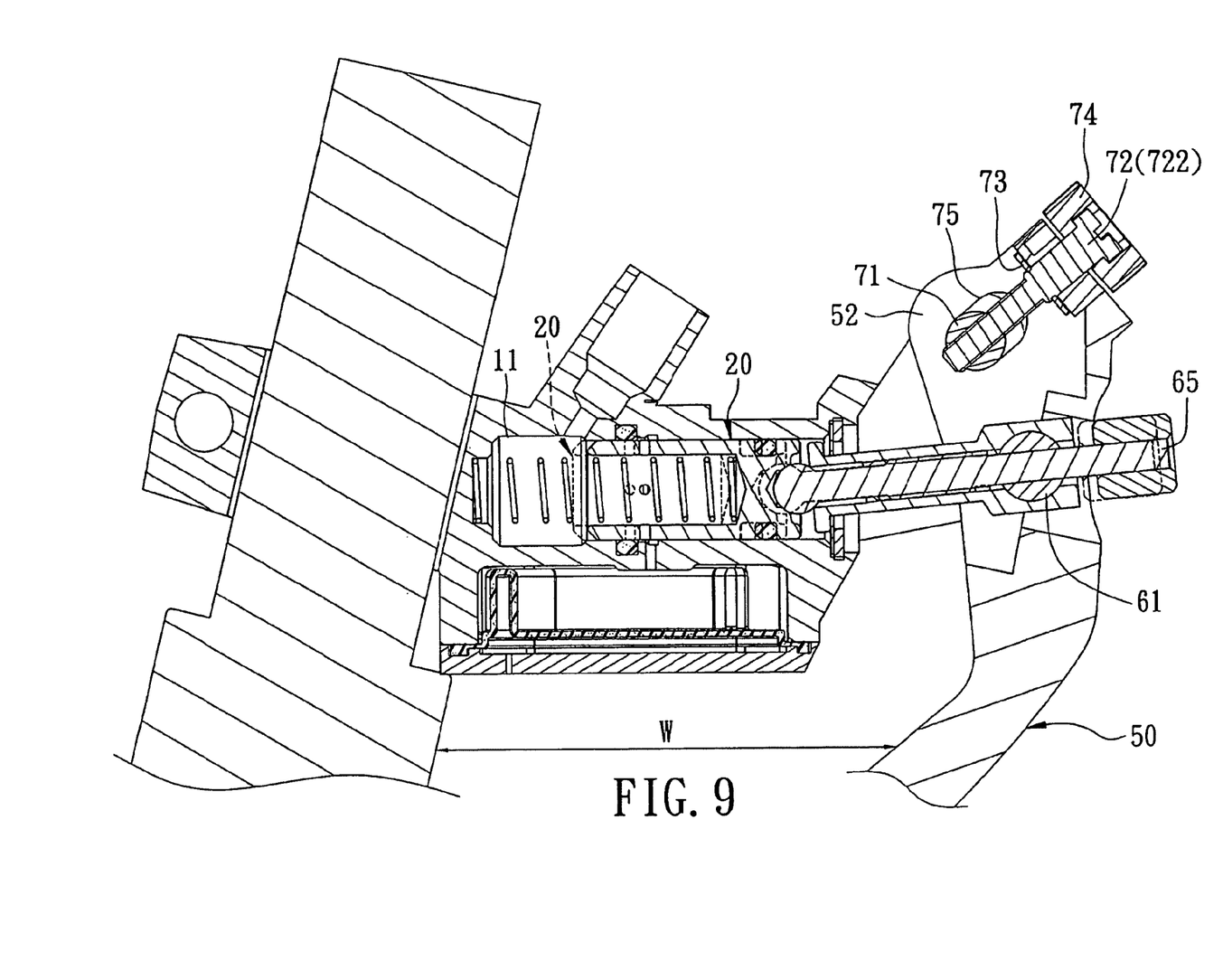
FIG. 9 is a view similar to FIG. 8 but illustrating the brake lever at a smallest-reach position and illustrating how the reach distance is maintained unchanged when the starting position is adjusted.

In a situation where the brake lever 50 is at a largest-reach position shown in FIG. 8, when the rotary knob 63 is rotated to result in the threading movement of the first adjustment rod 65 relative to the sleeve member 64, the piston 20 is moved within the cylinder 11 by the first adjustment rod 65 or the spring 40, thereby varying the starting position. During rotation of the rotary knob 63, since the first adjustment rod 65 is moved relative to the sleeve member 64, rotation of the brake lever 50 can be prevented. That is, the brake lever 50 is maintained at the largest-reach position. In a situation where the brake lever 50 is at a smallest-reach position shown in FIG. 9, when the first adjustment rod 65 is threaded relative to the sleeve member 64, the starting position of the piston 20 within the cylinder 11 can also be changed such that the brake lever 50 cannot be rotated. As such, the smallest-reach position of the brake lever 50 is maintained.

Figure 10:
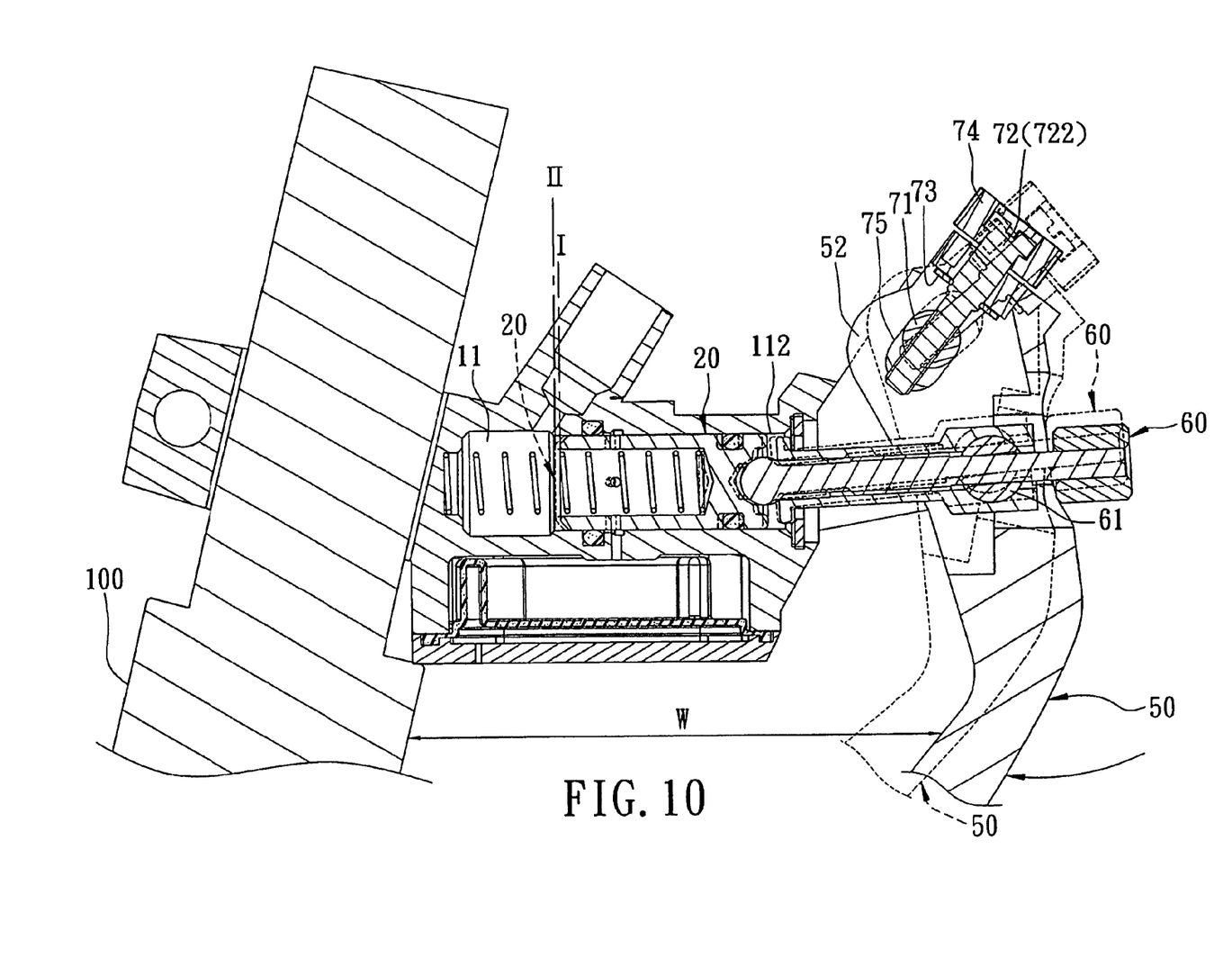
FIG. 10 is a fragmentary, schematic sectional view of the preferred embodiment, illustrating the piston at a starting position proximate to an outer end of a cylinder and illustrating how only a minimal change is caused in the starting position when the reach distance is adjusted.

With further reference to FIG. 10, in a situation where the piston 20 is at a first starting position (I) proximate to the outer end 112 of the cylinder 11, when the rotary knob 74 is rotated in such a manner to move the pivot end portion 722 of the second adjustment rod 72 away from the second pivot 71, the brake lever 50 is pushed by the C-shaped retaining ring 73 to rotate about the first pivot 61 clockwise (i.e., in a direction toward the handlebar 100) from a pre-adjustment position shown by the solid lines in FIG. 10 to a post-adjustment position shown by the phantom lines in FIG. 10, such that the second pivot 71 is moved within the adjustment slots 75 in the lug walls 52. Hence, the reach (W) becomes small. At the same time, due to rotation of the brake lever 5, the piston 20 is moved from the first starting position (I) to a second starting position (II) that is spaced apart from the first starting position (I) by only a minimal distance.

Figure 11:
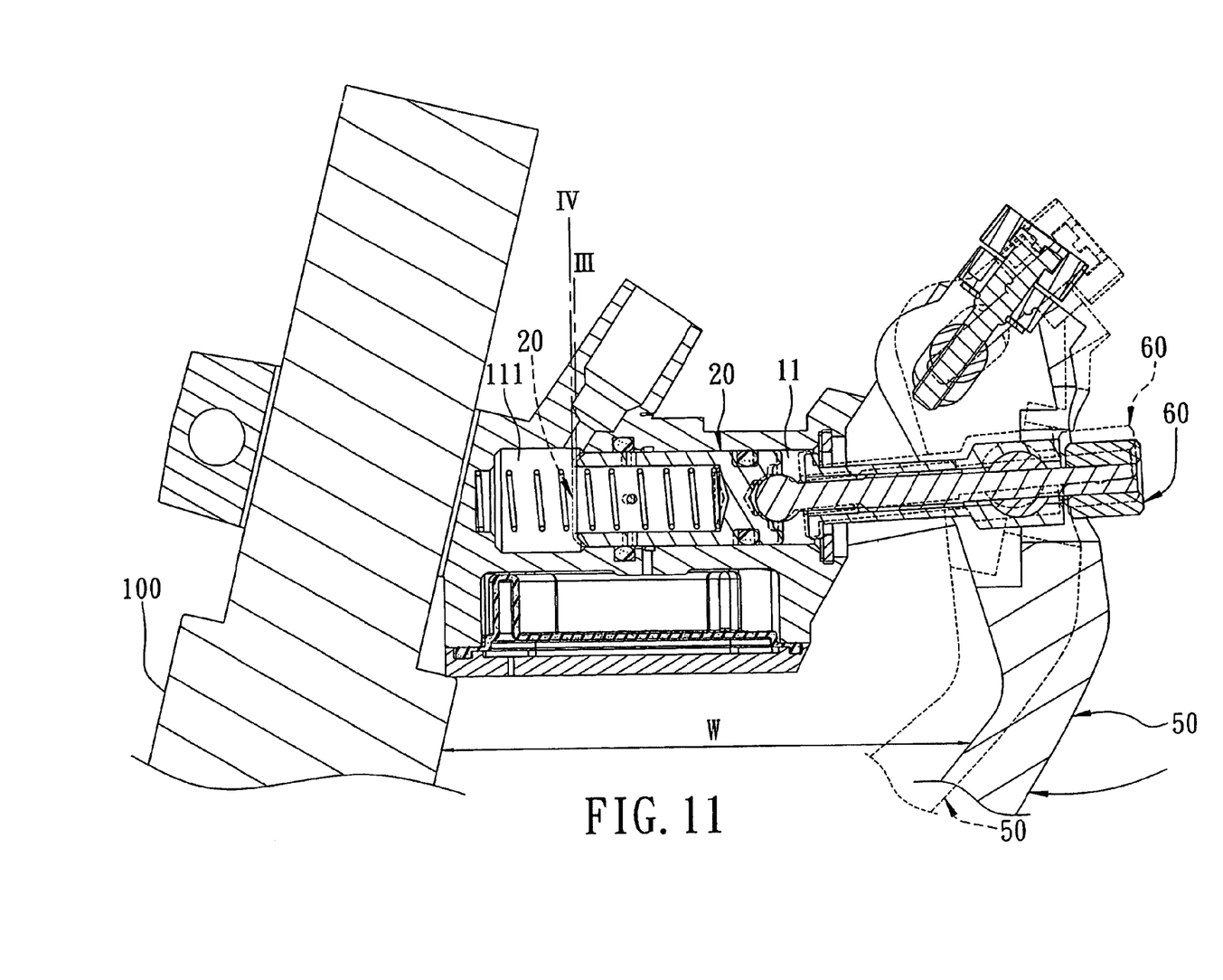
FIG. 11 is a view similar to FIG. 10 but illustrating the piston at another starting position distal from the outer end of a cylinder and illustrating how only a minimal change is caused in the starting position when the reach distance is adjusted.

With further reference to FIG. 11, in a situation where the piston 20 is at a third starting position (III) distal from the outer end 112 of the cylinder 11, when the rotary knob 74 is operated to reduce the reach (W), the piston-adjusting unit 60 is activated by the brake lever 50 to move the piston 20 from the third starting position (III) to a fourth starting position (IV) that is spaced apart from the third starting position (IV) by only a minimal distance.

In view of the above, the advantages of the hydraulic brake of this invention can be summarized as follows:

(1) The piston-adjusting unit 60 is simple in construction, and is operable to adjust the starting position of the piston 20 in such a manner that the rotation of the brake lever 50 relative to the body is prevented. That is, the reach (W) is maintained unchanged when the starting position of the piston 20 is adjusted.

(2) The reach-adjusting unit 70 is also simple in construction, and is operable to adjust the reach (W) of the brake lever 50 in such a manner that a significant change of the starting position of the piston 20 is prevented. During the adjustment of the reach (W), it is not necessary to disassemble and reassemble the reach-adjusting unit 70, thereby resulting in convenience during use of the hydraulic brake.

With this invention thus explained, it is apparent that numerous modifications and variations can be made without departing from the scope and spirit of this invention. It is therefore intended that this invention be limited only as indicated by the appended claims.

We claim:

1. A hydraulic brake comprising:
a body defining a cylinder, said cylinder having opposite inner and outer ends;
a piston disposed within said cylinder between said inner and outer ends;
a brake lever disposed pivotally on said body such that, when said brake lever is in an idle condition, said piston is disposed at a starting position in said cylinder; and
a piston adjusting unit including a first pivot disposed rotatably on said brake lever, and a push rod unit connected between said piston and said brake lever, said first pivot having a through hole formed therethrough, and an outer peripheral surface, said push rod unit including a sleeve member and a first adjustment rod, said sleeve member having a first end confined in said cylinder, a second end opposite to said first end and connected pivotally to said outer peripheral surface of said first pivot, and an adjustment hole extending from said first end to said second end and in spatial communication with said through hole in said first pivot, said first adjustment rod engaging threadably said adjustment hole in said sleeve member, and having an inner end in contact with said piston, and an outer end disposed outwardly of said through hole, said first adjustment rod being threadable within said sleeve member to vary the starting position.

2. The hydraulic brake as claimed in claim 1, wherein said cylinder has an inner surface formed with an annular groove, said first end of said sleeve member being formed with an outward flange extending radially and outwardly therefrom, said body further having a C-shaped retaining ring receiving within said annular groove in said cylinder, sleeved on said sleeve member, and adjacent to said first end for confining said first end of said sleeve member within said cylinder.

3. The hydraulic brake as claimed in claim 2, wherein said piston-adjusting unit further includes a rotary knob connected to and co-rotatable with said outer end of said first adjustment rod.

4. The hydraulic brake as claimed in claim 3, wherein said brake lever has an outer sidewall formed with a penetrating hole therethrough, said first adjustment rod extending through said penetrating hole such that said outer end of said first adjustment rod and said rotary knob are disposed outwardly of said penetrating hole.

5. The hydraulic brake as claimed in claim 1, further comprising a seal disposed between said cylinder and said piston so as to establish a fluid-tight seal therebetween, said body further defining a fluid reservoir, and a connecting port in spatial communication with said cylinder and said fluid reservoir such that, when said piston is disposed at the starting position, fluid flow between said cylinder and said fluid reservoir is allowed, and when a force is applied to said brake lever to thereby move said piston relative to said cylinder to a pressurized position, the fluid flow between said cylinder and said fluid reservoir is prevented by said seal.

6. The hydraulic brake as claimed in claim 5, wherein said seal is disposed on said body between said inner and outer ends of said body, said connecting port being disposed between said seal and said outer end of said body, said piston having an accommodating groove that is open toward said inner end of said body, and a plurality of radial holes extending radially and in fluid communication with said accommodating groove such that, when said piston is at said starting position, said radial holes are disposed between said seal and said outer end of said body, and are in fluid communication with said connecting port, and when said piston is at said pressurized position, said radial holes are disposed between said inner end of said body and said seal so as not to be in fluid communication with said connecting port.

7. The hydraulic brake as claimed in claim 6, further comprising a spring disposed within said accommodating groove between said inner end of said body and said piston for biasing said piston to move away from said inner end of said body.

8. The hydraulic brake as claimed in claim 1, further comprising a reach-adjusting unit that includes a second pivot disposed on said body, a second adjustment rod disposed pivotally on said brake lever and engaging threadably said second pivot, and at least one adjustment slot formed in said brake lever and permitting said second pivot to be moved therein in a longitudinal direction of said second adjustment rod, said second pivot having a threaded hole, said second adjustment rod having a threaded section engaging said threaded hole in said second pivot, and a pivot end portion extending from said threaded section and connected pivotally to said brake lever such that, when said second adjustment rod is threaded relative to said second pivot, movement of said pivot end portion of said second adjustment rod relative to said second pivot results in rotation of said brake lever about said first pivot relative to said body.

9. The hydraulic brake as claimed in claim 8, wherein said reach-adjusting unit further includes a retaining ring and a rotary knob, said brake lever further having an outer sidewall that is formed with a through hole therethrough and that has opposite inner and outer surfaces, said pivot end portion of said second adjustment rod extending through said through hole in said outer sidewall of said brake lever, said retaining ring being sleeved on said pivot end portion of said second adjustment rod and abutting against said inner surface of said outer sidewall, said rotary knob being retained on said outer surface of said outer sidewall by said retaining ring and connected non-rotatably to said pivot end portion of said second adjustment rod.

10. The hydraulic brake as claimed in claim 9, wherein said brake lever has two spaced-apart lug walls extending respectively from two opposite sides of said outer sidewall, said reach-adjusting unit including two said adjustment slots formed respectively through said lug walls.

* * * * *